United States Patent
Koch et al.

(10) Patent No.: US 9,686,098 B2
(45) Date of Patent: *Jun. 20, 2017

(54) EFFICIENT MANAGEMENT OF RING NETWORKS

(75) Inventors: Christopher D. Koch, Minneapolis, MN (US); David Cleary, Bloomington, MN (US)

(73) Assignee: Calix, Inc., Petaluma, CA (US)

(*) Notice: Subject to any disclaimer, the term of this patent is extended or adjusted under 35 U.S.C. 154(b) by 1421 days.

This patent is subject to a terminal disclaimer.

(21) Appl. No.: 13/183,123

(22) Filed: Jul. 14, 2011

(65) Prior Publication Data
US 2011/0267940 A1 Nov. 3, 2011

Related U.S. Application Data

(63) Continuation of application No. 12/109,519, filed on Apr. 25, 2008, now Pat. No. 8,004,966.

(51) Int. Cl.
*H04L 12/423* (2006.01)
*H04L 12/437* (2006.01)
(Continued)

(52) U.S. Cl.
CPC .......... *H04L 12/423* (2013.01); *H04L 12/437* (2013.01); *H04L 43/0817* (2013.01); *H04L 41/06* (2013.01)

(58) Field of Classification Search
CPC ....... H04L 12/437; H04L 12/42; H04L 43/50; H04L 12/423; H04L 43/0817; H04L 41/06; H04J 3/085; H04J 3/14; H04J 14/0283
(Continued)

(56) References Cited

U.S. PATENT DOCUMENTS 5,958,064 A * 9/1999 Judd et al. ............... 714/4.4
6,301,224 B1 * 10/2001 Rijhsinghani et al. ....... 370/227
(Continued)

FOREIGN PATENT DOCUMENTS

EP 0 973 301 A2 1/2000
EP 1 575 221 A1 9/2005

OTHER PUBLICATIONS

"Ethernet Automatic Protection Switching (EAPS)" White Paper (1293_01), Extreme Networks, Inc., Nov. 2006, 5 pages.
(Continued)

*Primary Examiner* — Obaidul Huq
(74) *Attorney, Agent, or Firm* — Shumaker & Sieffert, P.A.

(57) ABSTRACT

In general, techniques are described for efficient management of ring networks with a system of two network devices. The first network device of the ring network is designated as an adjacent selective forwarding (ASF) device, and the second network device is designated as a master device. The master device monitors the ring network to determine whether a fault has occurred in the ring network and transmits via a secondary port of the master device a network status message to the ASF device based on the determination of whether the fault has occurred. The ASF device determines a status of the ring network based on the network status message and selectively forwards data traffic to the master network device based on the determination of the status. As a result, the master device more efficiently utilizes network resources by not consuming processor or memory resources to prevent traffic loops.

33 Claims, 5 Drawing Sheets

(51) Int. Cl.
*H04L 12/26* (2006.01)
*H04L 12/24* (2006.01)

(58) Field of Classification Search
USPC ....... 370/216, 221, 222, 241, 242, 250, 251; 398/1, 2, 3, 4, 9, 17; 714/699, 712, 717
See application file for complete search history.

(56) References Cited

U.S. PATENT DOCUMENTS

| | | |
|---|---|---|
| 6,717,922 B2 | 4/2004 | Kamat et al. |
| 6,766,482 B1 | 7/2004 | Yip et al. |
| 6,834,056 B2 | 12/2004 | Hayes |
| 7,003,705 B1 | 2/2006 | Yip et al. |
| 7,006,431 B1 * | 2/2006 | Kanekar et al. .............. 370/217 |
| 7,126,923 B1 | 10/2006 | Yang et al. |
| 7,154,861 B1 | 12/2006 | Merchant et al. |
| 7,342,877 B1 | 3/2008 | Ervin et al. |
| 2003/0202463 A1 | 10/2003 | de Heer et al. |
| 2005/0243823 A1 | 11/2005 | Griswold et al. |
| 2006/0245351 A1 * | 11/2006 | Pande et al. ................... 370/216 |
| 2007/0204068 A1 * | 8/2007 | Oku et al. ..................... 709/251 |
| 2009/0003320 A1 | 1/2009 | Luo et al. |

OTHER PUBLICATIONS

Recommendation ITU-T, G.8032/Y.1344, Ethernet ring protection switching, Mar. 2010, 98 pages.
Sonet, Synchronous Optical Networking, Technical Overview, White Paper, Lucent Technologies, Jan. 1999, 22 pages.

* cited by examiner

EFFICIENT MANAGEMENT OF RING NETWORKS

This application is a Continuation of application Ser. No. 12/109,519, filed on Apr. 25, 2008, the entire contents of which are incorporated herein by reference.

TECHNICAL FIELD

The invention relates to computer networks and, more particularly, network devices that manage computer networks.

BACKGROUND

A computer network is a collection of interconnected computing devices that can exchange data and share resources. Often, in highly populated areas, the computer network is configured in a ring formation, where certain devices, referred to as "switches," are interconnected via network links in the shape of a ring. That is, each switch couples via a separate network link to two adjacent switches, one clockwise and the other counter-clockwise around the ring. When shaped in a ring, the optical fiber network is referred to as a "ring network."

Generally, the switches provide access to the ring network. The computing devices couple to the switches to gain access to the ring network and thereby interconnect with other computing devices coupled to the ring network. The computing devices generate data traffic and exchange this data traffic with other computing devices via the interconnection provided by the ring network. The switches forward the data traffic typically in a determined direction, e.g., clockwise or counter-clockwise, around the ring to facilitate the exchange. The ring network may provide generous geographical coverage due to its shape, which allows the ring network to reach computing devices dispersed over wide geographical areas. The ring network may be resilient in that it can forward data in both the clockwise and counter-clockwise directions to avoid a faulted link.

While providing generous geographical coverage and reasonable resilience, the ring network may suffer from traffic loops. For certain types of data that do not include a specific destination, such as multicast or broadcast data, for example, each of the switches may simply forward this data around the ring to ensure each switch forwards the ring to every computing device. If none of the switches identify that this data is looping the ring network, each switch may continue to forward the traffic endlessly, thereby establishing a traffic loop, which may substantially impact the performance of the ring network by needlessly consuming network resources, such as switch processing time and memory as well as link bandwidth.

Some ring networks, however, implement network management techniques to correct for traffic loops. One such network management technique, for example, may designate one of the devices of the ring network as a master device, where the master device includes a primary port and a secondary port. The master device forwards traffic via the primary port and blocks traffic via the secondary port. Typically, the master device blocks the secondary port logically. In other words, the master device may actively filter traffic arriving via the secondary port, discarding or dropping certain traffic, such as data traffic, but allowing other traffic, such as control traffic used by the master device to monitor or otherwise control the ring network. By blocking traffic arriving via the secondary port in this manner, the master device ensures that data traffic does not continually loop the ring network, while preserving the beneficial aspects of generous geographical coverage and resilience associated with the ring network.

SUMMARY

In general, the invention is directed to techniques for efficiently managing a network. More particularly, the efficient network management techniques may more efficiently utilize network resources by designating a network device as an adjacent selective forwarding (ASF) network device that operates in conjunction with a network device designated as a master network device to prevent traffic loops and otherwise monitor and manage ring a network. The ASF network device may, as the name suggests, selectively forward traffic to the master network device, likely resulting in substantially less consumption of network resources, such as memory space and processor cycles at the master network device as well as bandwidth over a link coupling the ASF network device to the master device, while also preventing traffic loops.

In other words, the ASF network device may selectively forward data traffic by dropping data traffic during normal operation of the ring network, thereby preventing data loops but preserving monitoring and other network management aspects. Because the master device does not receive the data traffic, the master device may require less memory space and conserve processor cycles, as well as, reduce bandwidth consumption over the link coupling the master and ASF network devices. Upon the master device detecting a fault, the master device may inform the ASF network device of the fault either directly via a message or some other warning or indirectly by not forwarding a message. In response to either action, the ASF network device may selectively forward data traffic by forwarding the data traffic to the master device. In this case, the faulted link prohibits any traffic loops. In this manner, the master and ASF network devices, by operating in conjunction, may not only facilitate data traffic rerouting in the event of a fault in one of the network links, but also conserve or more efficiently utilize network resources during normal or non-faulted operation of the ring network.

For example, the master network device monitors the ring network to determine whether a fault occurred in the ring network. The master network device may transmit continuity check message that circle the ring network, and base the determination upon successful receipt of the continuity check message. Alternatively, the master network device may determine the fault has occurred based on receipt of a link-down message transmitted by another network device that detected the fault. If no fault is detected, the master network device transmits a network status message indicated the no-fault status of the ring network to the ASF network device. If the fault is detected or determined, the master network device does not transmit the network status message to the ASF network device, thereby indicating the faulted status of the ring network to the ASF network device.

Meanwhile, the ASF network device receives data traffic destined for the master network device and selectively forwards the data traffic to the master network device based upon the status of the ring network as indicated by the network status messages. That is, the ASF network device may determine the status of the ring network based on receipt of the network status message. If the no fault status is determined, i.e., the ASF network device receives the network status message, the ASF network device may selectively forward the data traffic by dropping the data traffic destined for the master network device. By dropping the traffic, bandwidth is conserved over the link coupling the ASF network device to the master network device while also preventing traffic loops. Moreover, because the master network device does not receive the data traffic, the master network device no longer requires processor cycles to filter the traffic or memory to store the traffic. If the fault status is determined, the ASF network device may selectively forward traffic by forwarding the data traffic to the master network device, thereby allowing the ring network to adapt to the fault.

In one embodiment, a method comprises monitoring, with a first device of a ring network designated as a master device, the ring network to determine whether a fault has occurred in the ring network, wherein the master device comprises a primary port and a secondary port. The method also comprises transmitting, based on the determination, via the secondary port of the master device a network status message to a second device of the ring network designated as an adjacent selective forwarding device. The adjacent selective forwarding device couples to the secondary port of the master device via a network link and selectively forwards traffic to the master device in a manner that avoids traffic loops until the master devices determines the fault has occurred in the ring network. The method further comprises receiving, subsequent to the determination that the fault has occurred in the ring network, data traffic with the master device from the adjacent selective forwarding device.

In another embodiment, a method comprises determining, with a first device of a ring network designated as an adjacent selective forwarding device, a status of the ring network based on a message received from a second device of the ring network designated as a master device and based on the determination, selectively forwarding, with the adjacent selective forwarding device, data traffic in a manner that limits data traffic loops and enables routing of the data traffic around a fault in the ring network. The method also comprises forwarding, with the adjacent selective forwarding device, control traffic, regardless of the determination that enables the master device to monitor the ring network to determine whether the fault has occurred.

In another embodiment, a network device designated as a master network device of a ring network comprises an interface module that includes a primary port and a secondary port and a control unit that includes a forwarding module. The forwarding module monitors the ring network to determine whether a fault has occurred in the ring network. The forwarding module further, based on the determination, transmits via the secondary port of interface module a network status message to a second network device of the ring network designated as an adjacent selective forwarding network device. The adjacent selective forwarding network device couples to the secondary port of the interface module via a network link and selectively forwards traffic to the master device in a manner that avoids traffic loops until the master devices determines the fault has occurred in the ring network. The forwarding module also receives, subsequent to the determination that the fault has occurred in the ring network, data traffic from the adjacent selective forwarding network device.

In another embodiment, a network device designated as an adjacent selective forwarding network device of a ring network comprises a control unit that includes a forwarding module to determine a status of the ring network based on a message received from a second network device of the ring network designated as a master network device and, based on the determination, selectively forward data traffic in a manner that limits data traffic loops and enables routing of the data traffic around a fault in the ring network. The forwarding module further, regardless of the determination, forward control traffic that enables the master network device to monitor the ring network to determine whether the fault has occurred.

In another embodiment, a system comprises a ring network and a first network device of the ring network designated as an adjacent selective forwarding network device. The adjacent selective forwarding network device includes a first control unit comprising a first forwarding module. The system further comprises a second network device of the ring network designated as a master network device. The master network device includes an interface module that comprises a primary port and a secondary port, and a second control unit that comprises a second forwarding module. The second forwarding module monitors the ring network to determine whether a fault has occurred in the ring network and transmits via the secondary port of interface module a network status message to the adjacent selective forwarding network device based on the determination of whether the fault has occurred. The first forwarding module of the adjacent selective forwarding network device determines a status of the ring network based on the network status message, and selectively forwards data traffic to the master network device based on the determination of the status.

In another embodiment, the invention is directed to a computer-readable medium. The computer-readable medium comprises instructions that cause a processor to monitor, with a first device of a ring network designated as a master device, the ring network to determine whether a fault has occurred in the ring network, wherein the master device comprises a primary port and a secondary port. The instructions further cause the processor to, based on the determination, transmit via the secondary port of the master device a network status message to a second device of the ring network designated as an adjacent selective forwarding device. The adjacent selective forwarding device couples to the secondary port of the master device via a network link and selectively forwards traffic to the master device in a manner that avoids traffic loops until the master devices determines the fault has occurred in the ring network. The instructions also cause the processor to receive, subsequent to the determination that the fault has occurred in the ring network, data traffic with the master device from the adjacent selective forwarding device.

In another embodiment, the invention is directed to a computer-readable medium. The computer-readable medium comprises instructions that cause a processor to determine, with a first device of a ring network designated as an adjacent selective forwarding device, a status of the ring network based on a message received from a second device of the ring network designated as a master device. The instructions also cause the processor to, based on the determination, selectively forward, with the adjacent selective forwarding device, data traffic in a manner that limits data traffic loops and enables routing of the data traffic around a fault in the ring network. Further, the instructions cause the processor to, regardless of the determination, forward, with the adjacent selective forwarding device, control traffic that enables the master device to monitor the ring network to determine whether the fault has occurred.

The details of one or more embodiments of the invention are set forth in the accompanying drawings and the descrip-

DETAILED DESCRIPTION

Figure 1:
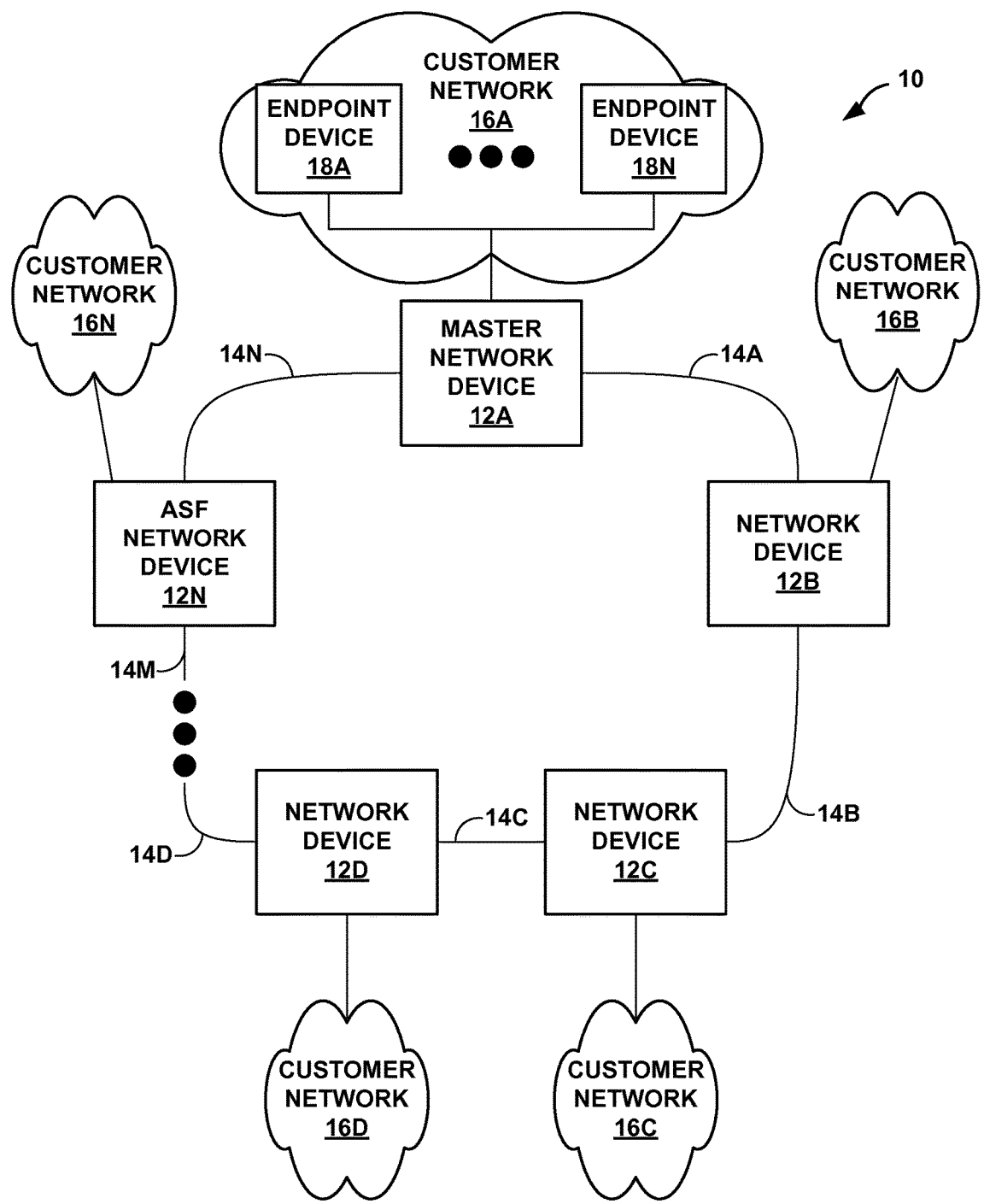
FIG. 1 is a block diagram illustrating an example ring network configured to perform the efficient network management techniques described in this disclosure.

FIG. 1 is a block diagram illustrating an example ring network 10 configured to perform the efficient network management techniques described in this disclosure. The network management techniques are "efficient" in that network resources are more efficiently utilized within network 10 relative to conventional techniques the block and unblock traffic solely at the master device of a ring network. Network resources may generally refer to network device-specific resources, such as memory space and processor cycles, and/or general network resources, such as link bandwidth.

The efficient network management techniques may more efficiently utilize these network resources by designating a network device as an adjacent selective forwarding (ASF) network device that operates in conjunction with a network device designated as a master network device to prevent traffic loops and otherwise monitor and manage ring network 10. The ASF network device may, as the name suggests, selectively forward traffic to the master network device, likely resulting in substantially less consumption of memory space and processor cycles at the master network device, while also preventing traffic loops.

That is, the ASF network device may selectively forward data and control traffic by dropping data traffic and forwarding control traffic during normal operation of ring network 10, thereby preventing data loops but preserving monitoring and other network management aspects. Because the master device does not receive the data traffic from ASF network device during normal operation, the master device may require less memory space and conserve processor cycles, as well as, reduce bandwidth consumption over the link coupling the master and ASF network devices. Upon the master device detecting a fault, the master device may inform the ASF network device of the fault either directly via a message or some other warning or indirectly by not forwarding a message. In response to either action, the ASF network device may selectively forward data and control traffic by forwarding both the data and control traffic to the master device, as the faulted link prohibits any traffic loops. In this manner, the master and ASF network devices, by operating in conjunction, may not only facilitate traffic rerouting in the event of a fault in one of the network links, but also conserve or more efficiently utilize network resources during normal or non-faulted operation of ring network 10.

As shown in FIG. 1, ring network 10 includes a plurality of network devices 12A-12N ("network devices 12"), links 14A-14N ("links 14"), and customer networks 16A-16N ("customer networks 16"). Each of the plurality of network devices 12 couple to at least two other of network devices 12 via respective links 14 to form a ring topology. For example, network device 12A couples to network devices 12B, 12N via links 14A, 14N, network device 12B couples to network devices 12A, 12C via links 14A, 14B, and so on, completing the ring with network device 12N coupling to network devices 12M, 12A via links 14M, 14N. Each of network devices 12 couple to a respective customer network 16 via links similar to links 14. Network devices 12 receive and forward traffic from customer network 16 over ring network 10, which may be referred to herein as "originating" traffic on ring network 10. Each of network devices 12 also forward traffic received from other network devices 12 via ring network 10 to respective customer networks 16, which may be referred to herein as "delivering" traffic.

The ring topology of ring network 10 may offer generous geographic coverage and resilience. That is, ring network 10 may reach customer networks 16 dispersed over wide geographic areas. Ring network 10 provides resilience because traffic originated by network devices 12 may be forwarded in both a clockwise and counter-clockwise direction around ring network 10. By enabling both directions of forwarding, network devices 12 may forward traffic so as to avoid one of links 14 that has failed, while still reaching every one of network devices 12. In particular, upon detecting a fault, for example, in link 14A, network device 12A may forward traffic via link 14N counter-clockwise around ring network 10 to reach network device 12B. Network device 12B may, to avoid assumed a faulted one of links 14, simultaneously forward traffic via link 14B clockwise around ring network 10 to reach network device 12A. Ring network 10 therefore supports simultaneous forwarding of traffic in both the clockwise and counter-clockwise directions to avoid the faulted one of links 14. Consequently, ring network 10 may not only provide generous geographical coverage but resilience as well.

An exemplary ring network 10 may include a wide area network (WAN) and a metropolitan area network (MAN). Ring network 10, because it services a plurality of customer networks 16, may be referred to as a "backbone" network, in that ring network 10 provides a backbone to support the exchange of traffic between the plurality of customer networks 16. Typically, to support the high level of traffic often found on backbone networks, links 14 may comprise optical fiber links to facilitate the rapid transfer of the traffic around ring network 10.

Network devices 12 may comprise one or more switches, routers, hubs or any other devices capable of forwarding data within ring network 10. In this optical configuration discussed above, network devices 12 may comprise optical switches, routers, hubs or any other network device capable of forwarding data within an optical configuration of ring network 10. Regardless of the underlying network type, e.g. optical, network devices 12 may support a variety of transports, such as Asynchronous Transport Mode (ATM) cells, Ethernet frames or packets, as well as, any other transport protocol used to convey data or information via a ring network, such as ring network 10. The efficient network management techniques should not, therefore, be limited to any one embodiment described in this disclosure, and instead may be implemented in any network device 12 that may be employed within a ring network 10 to generally originate, forward, drop and deliver traffic in accordance with any transport protocol to and from customer networks 16.

Customer networks 16 may each comprise links similar to links 14 and endpoint devices 18A-18N ("endpoint devices 18"), where the links of customer networks 16 may communicatively couple endpoint devices 18 to respective ones of network devices 12. Although only one set of a plurality of endpoint devices 18 are shown in FIG. 1, each of customer networks 16 may comprise a similar plurality of endpoint devices 18 similar to that of customer network 16A. Customer networks 16 are referred to as customer network to represent that ring network 10 generally services networks 16 as customers by originating and delivering traffic for each of networks 16.

Endpoint devices 18 may comprise a wide variety of computing devices, such as one or more of a cellular phone, a personal digital assistant (PDA), a workstation, a personal computer, a laptop computer, a television set-top box, a voice-over-internet protocol (VoIP) telephone, or any other computing device capable of generating and/or receiving traffic via ring network 10. That is, endpoint devices 18 may comprise any computing device capable of implementing network protocols, such as a transmission control protocol (TCP)/internet protocol (IP), to receive and forward traffic to and from network devices 12.

In accordance with the efficient network management techniques described in this disclosure, one of network devices 12 is designated as a master device and another of network devices 12 is designated as an adjacent selective forwarding (ASF) network device. These two devices are therefore represented in FIG. 1 as "master network device 12A" and "ASF network device 12N."

Typically, ASF network device 12N resides adjacent to master network device 12A, as suggested by the "adjacent" in ASF, however, the techniques contemplate instances where ASF network device 12N interacts with master network device 12A through any number of intermediary network devices 12. Moreover, any one of network devices 12 may be designated as either the master or the ASF network device and the location or other characteristics of master network device 12A and ASF network device 12N as depicted in FIG. 1 should not be strictly construed so as to limit the techniques as described herein. For example, a user may configure or designate network devices 12A, 12N as the respective master and ASF devices, or may configure or designate network devices 12B, 12A as the respective master and ASF network devices.

After being designated master, master network device 12A may initialize ring network 10 so as synchronize each of network devices 12 to that of master network device 12A. This synchronization phase may inform each of network devices 12 that they are part of the ring. The synchronization phase may further inform those network devices 12B-12M, which may be referred to herein as "transient network devices 12," of the master hierarchy and alert those transient network devices 12 that master network device 12A may begin forwarding continuity check messages around ring network 10. Moreover, the synchronization phase may indirectly designate network device 12N as the ASF network device. That is, master network device 12A synchronizes the ring network prior to monitoring the ring network to establish the designation of the first and second devices as the respective master and adjacent selective forwarding devices. Therefore, a user, such as an administrator may not be required to directly designate or configure ASF network device 12N as the ASF network device, but instead, ASF network device 12N may determine or learn that it is the ASF device during the synchronization phase.

Master network device 12A forwards continuity check messages around ring network 10 to determine whether a fault has occurred on one of links 14. Master network device 12A may comprise a primary and a secondary port (not shown in FIG. 1), where the primary port represents a port for forwarding control traffic and the secondary port represents a port for receiving traffic. These primary and secondary ports may effectively establish a direction for the flow of data and control traffic around the ring. That is, the primary port may forward traffic via link 14A and the secondary port may receive traffic from link 14N, thereby establishing that traffic flows clockwise around ring network 10. Master network device 12A therefore may forward the continuity check message via the primary port clockwise around the ring. Upon receiving the continuity check back at the secondary port, master network device 12A may determine that no faults exist in any of links 14.

Transient network devices 12, or network devices 12B-12M, may require the synchronization phase such that they can configure respective forwarding tables to forward this continuity check message in the appropriate directions, such as the exemplary clockwise direction discussed above. Without proper synchronization, one of transient network devices 12 may fail to forward or significantly delay forwarding of the continuity check message. Master network device 12A may maintain a continuity timer or other count and upon expiration of the continuity timer, for example, may determine a fault in one of links 14. If one of transient network devices 12 unnecessarily delays forwarding of the continuity check message, master network devices 12A may determine a fault where no actual fault exists, i.e., a false positive. Thus, master network device 12A may synchronize ring network 10 prior to sending the continuity check messages, originating, delivering or otherwise exchanging any other traffic on ring network 10.

Once synchronized, master network device 12A may forward the continuity check message around ring network 10, typically, at set intervals, such as every millisecond or every 100 milliseconds, to monitor links 14, e.g., detect a failed one of links 14. If master network device 12A does not detect a failed one of links 14, master network device 12A may transmit a network status message to ASF network device 12N. The network status message may not traverse transient network devices 12 and, therefore, may only be received by ASF network device 12N via link 14N. Upon receiving the network status message, ASF network device 12N may determine a status, e.g., that no faults exist on any links 14, of ring network 14 and selectively forward traffic to master network device 12A by dropping all data traffic (but not control traffic) destined for master network device 12A. By dropping the data traffic and not the control traffic, ASF network device 12N prevents data traffic loops that otherwise might occur in ring network 14 but preserves all control or monitoring aspects associated with monitoring links 14, as described above for example.

If, however, master network device 12A does not transmit a network status message, ASF network device 12N may determine the status, e.g., that a fault exists within one of links 14, of ring network 14. In response to this determination, ASF network device 12N may selectively forward data traffic destined for master network device 12A by forwarding the data traffic via link 14N to master network device 12A. The existence of the fault in one of links 14 prevents traffic loops, and to preserve connectivity between each and every one of network devices 12, ASF network device 12N forwards this data traffic to master network device 12A.

Considering the network status messages from the perspective of ASF network device 12N, ASF network device 12N may maintain a status timer similar to the above described continuity timer and reset such timer upon receiving each network status message. If the status timer is reset prior to expiration, ASF network device 12N drops the traffic destined for master network device 12A. If, however, the status timer expires, ASF network device 12N begins forwarding the traffic destined for master network device 12A.

The cooperation between master network device 12A and ASF network device 12N prevents traffic loops without limiting the benefits described above with respect to ring network 10, even in instances where link 14N fails. That is, when link 14N fails, the network status message does not reach ASF network device 12N before the status timer expires, and ASF network device 12N forwards the data traffic destined for master network device 12A via failed link 14N. But as link 14N has failed, the traffic still does not reach master network device 12A and traffic loops are still prevented. As a result, traffic loops are prevented regardless of the state of links 14 of ring network 10 while also enabling resilience through careful monitoring by way of continuity check messages sent around ring network 10.

Master network device 12A enables resilience by causing each of network devices 12 to relearn the current topology of ring network 14. While forwarding and otherwise processing packets, each of network devices 12 may discover a location of each endpoint device 18 as it relates to network device 12. As an example, network device 12B may learn that endpoint device 18A is reachable via master network device 12A. Alternatively, network device 12B may learn that traffic destined for endpoint device 18A should be forwarded to network device 12C. In any event, each of network devices 12 may maintain forwarding tables that reflect the current network topology of ring network 10. Upon detecting a failed link 14 that changes this previously learned topology by way of the continuity check message or other "link down" messages described below in more detail, master network device 12A may coordinate relearning of the now changed or altered network topology to account for failed link 14 and the above described forwarding by ASF network device 12N.

To coordinate this relearning, master network device 12A may forward a clear tables message which causes each of network devices 12 to clear their respective forwarding tables. By clearing these forwarding tables, each of network devices 12 is forced to relearn the current topology of ring network 10, thereby accounting for any changes in ring network 10. The inherent resilience aspect of ring network 10 is therefore preserved because network devices 12 may relearn the forwarding of packets to account for a fault in one of links 14, thereby rerouting traffic around any such faults.

Therefore, traffic loops may be prevented without compromising the inherent resilience of ring network 10, while also preserving or efficiently utilizing network resources. Because the master device does not receive the data traffic from ASF network device 12N during normal operation (i.e., where no faults exist in the ring), the master device may require less memory space and conserve processor cycles previously utilized to filter the data traffic, as well as, use reduced bandwidth over the link coupling master network device 12A and ASF network devices 12N. This efficient utilization may be particularly beneficial during times of relatively high network congestion where processor utility in master network device 12A reaches maximum capacities, such as 95% processor utilization. Moreover, bandwidth of link 14N previously utilized to convey traffic destined to be filtered may now be utilized for other purposes, thereby increasing the efficiency of ring network 10.

Figure 2:
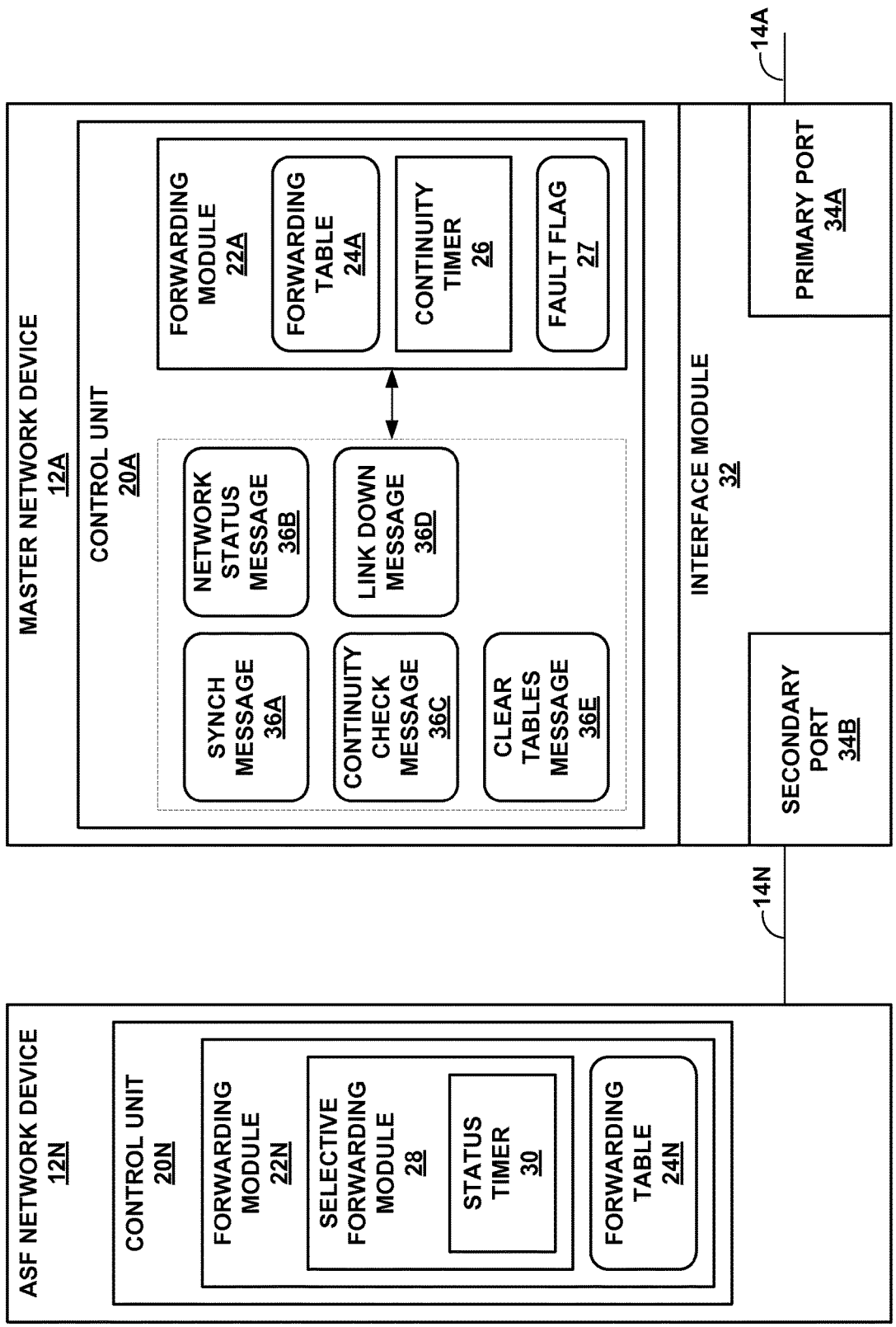
FIG. 2 is a block diagram illustrating the master and ASF network devices of FIG. 1 in more detail.

FIG. 2 is a block diagram illustrating master and ASF network devices 12A, 12N of FIG. 1 in more detail. Although described below with respect to network devices 12A, 12N, each of network devices 12 may include one or more of the components, modules, messages, ports, timers or tables substantially similar to those described below with respect to network devices 12A, 12N. Again, as noted above, network devices 12A, 12N are merely exemplary master and ASF network devices.

As shown in FIG. 2, both of master and ASF network devices 12A, 12N include respective control units 20A, 20N ("control units 20"). Each of control units 20 may represent hardware, software, or a combination of both to implement the efficient network management techniques described in this disclosure. That is, control units 20 may, for example, each comprise any combination of one or more processors, one or more field programmable gate arrays (FPGAs), one or more application specific integrated circuits (ASICs), and one or more application specific standard products (ASSPs). Each of control unit 20 may also comprise memory, both static (e.g., hard drives or magnetic drives, optical drives, FLASH memory, EPROM, EEPROM, etc.) and dynamic (e.g., RAM, DRAM, SRAM, etc.), or any other computer readable storage medium capable of storing instructions that cause the one or more processors to perform the efficient network management techniques described in this disclosure. Thus, control units 20 may each represent any combination of hardware and/or software to support the below described components, modules or elements, and the techniques should not be strictly limited to any particular embodiment described below.

Each of control unit 20 includes a respective forwarding module 22A and 22N ("forwarding modules 22"). Forwarding modules 22 each represent a module that forwards data traffic according to respective forwarding tables 24A, 24N ("forwarding tables 24"), as described above. Forwarding module 22A of master network device 12A also includes a continuity timer 26, which as described above, may represent an exemplary mechanism used to determine whether one of links 14 has failed or otherwise stopped functioning, and a fault flag 27, which is described below in more detail. Forwarding module 22N of ASF network device 12N includes a selective forwarding module 28 that may represent a module responsible for selectively forwarding data traffic destined for master network device 12A via link 14N in accordance with the efficient network management techniques described herein. Selective forwarding module 28 comprises a status timer 30, which as described above may represent an exemplary mechanism upon which selective forwarding module 28 may base the decision to drop or forward traffic destined for master network device 12A.

Master network device 12A further includes an interface module 32. Interface module 32 represents a module for interfacing with each of links 14A, 14N. Interface module includes a primary port 34A and a secondary port 34B, where primary port 34A interfaces with link 14A and secondary port 34B interfaces with link 14N. Although not shown for ease of illustration purposes, interface module 32 may comprise additional ports for receiving additional links. For example, one or more of these additional ports may interface with the additional links to couple master network device 12A to customer network 16A. Moreover, ASF network device 12N may also include an interface module similar to interface module 32, which is not shown in FIG. 2 also for ease of illustration purposes.

Primary port 34A and secondary port 34B are illustrated in this manner merely for exemplary purposes and represent logical designations. That is, currently designated secondary port 34B may be re-designated as a primary port 34B and primary port 34A may also be re-designated as secondary port 34A. However, considering the exemplary designations as shown in FIG. 2, master network device 12A forwards data traffic in a clockwise direction around ring network 10 because as described above, master network device 12A forwards traffic via primary port 34A and receives data via secondary port 34B.

In accordance with the efficient network management techniques described in this disclosure, master network device 12A may initially, upon powering-on or otherwise activating ring network 10, issue, send or otherwise transmit synchronization message 36A ("synch message 36A") via primary port 34A and link 14A around ring network 10, such that each of network devices 12, including ASF network device 12N enter the above described synchronization phase. Synch message 36A may comprise a first Ethernet operation and maintenance (Ethernet OAM) continuity check message, which may be referred to herein as "CC_OAM_UP message." The "UP" portion refers to synchronization or activation aspects (as in synching or powering "up") the CC_OAM_UP message is intended to address.

Forwarding module 22A of master network device 12A transmits synch message 36A, e.g., the CC_OAM_UP message, from primary port 34A such that it receives synch message 36A at secondary port 34B. Synch message 36A informs all other devices 12 that it has begun sending network status messages, e.g., network status message 36B, to ASF device 12N. Those transient network devices 12 understand, upon receiving a third or some other set number of synch messages 36A without receiving any network status messages 36B, that those ports on which they received synch messages 36A can be used as transmission facility for data traffic.

That is, those transient network devices 12 understand through the above described process that they are not designated as the ASF device or otherwise perform the selective forwarding operations discussed above. In this manner, master network device 12A initializes ring network 10 such that ASF network device 12N understands its role as the ASF network device or otherwise learns of its designation as the ASF network device and those transient network devices 12 understand their roles as transient network devices. Thus, an administrator may only configure master network device 12A and specify within master network device 12A which other device is the ASF device. Master network device 12A may then inform ASF network device 12N, for example, indirectly of the designation by way of transmitting network status message 36B only to that device 12N during the synchronization phase.

As mentioned above, forwarding module 22A, while transmitting synch messages 36A, may also transmit network status messages 36B to that network device 12 designated as the ASF network device, e.g., ASF network device 12N. Network status message 36B may also comprise an Ethernet OAM continuity check message, referred to herein as "secondary port CC_OAM message" because it is issued from secondary port 34A of master network device 12A. This secondary port CC_OAM message 36B may be sent to and only received by ASF network device 12N, such that no other device 12 receives message 36B. As described above, this may ensure proper synchronization of ring network 10 by establishing each of the respective roles of devices 12. Master network device 12A may continuously forward this network status message 36B until it detects a failed one of links 14, also as described above.

Master network device 12A may detect a failed one of links 14 in one of two ways. In the first way, forwarding module 22A of master network device 12A may forward the above described continuity check message 36C, which also may comprise a Ethernet OAM continuity check message that is herein referred to as "primary port CC_OAM message" because it is issued or transmitted from the logically designated primary port 34A. Forwarding module 22A may forward continuity check message 36C via primary port 34A, set continuity timer 26, and wait to receive continuity check message 36C via secondary port 34B. If forwarding module 22A receives continuity check message 36C prior to expiration of continuity timer 26, forwarding module 22A transmits network status message 36B to ASF network device 12N. If forwarding module 22A, however, does not receive continuity check message 36C prior to expiration of continuity timer 26, forwarding module 22A detects or determines a fault in one of link 14, and does not forward network status message 36B to ASF network device 12N via secondary port 34B and link 14N.

In the second way, master network device 12A detects a failed one of links 14 via a link down message 36D. Link down message 36D is typically transmitted to master network device 12A by one of devices 12 upon that device 12 detecting the failure of an adjacent link 14. For example, network device 12C may detect that link 14C failed and transmit a link down message 36D in the counter-clockwise direction to master network device 12A via link 14B. Upon receiving such a message 14D from any of network devices 12, master network device 12A may detect or determine that one of links 14 failed, and stop transmitting network status message 36B to ASF network device 12N via secondary port 34B and link 14N.

As described above, ASF network device 12N may maintain, with selective forwarding module 28, a status timer 30 on which ASF network device 12N may base the selective forwarding of data traffic destined for master network device 12A. Upon receiving a network status message 36B from master network device 12A, selective forwarding module 28 may reset status timer 30. If selective forwarding module 28 receives network status message 36B prior to expiration of status timer 30, selective forwarding module 28 selectively forwards the data traffic destined for master network device 12A by dropping this traffic. However, if selective forwarding module 28 does not receive network status message 36B prior to expiration of status timer 30, selective forwarding engine 28 selectively forwards the data traffic destined for master network device 12A by forwarding this traffic via link 14N to master network device 12A.

Also, upon detecting a failed one of links 14 in any of the above listed ways, forwarding module 22A of master network device 12A may transmit a clear tables message 36E. As described above, clear tables message 36E may cause network devices 12 to clear respective forwarding tables 24 so as to properly relearn a topology of ring network 10. That is, clear tables message 36E causes network devices 12 to account for the faulted one of links 14 and the forwarding of data traffic by ASF network device 12N via link 14N to master network device 12A. In this manner, not only may resilience be provided and traffic loops prevented, but more efficient use of link 14N may be enabled through implementation of the techniques as described in this disclosure.

Figure 3:
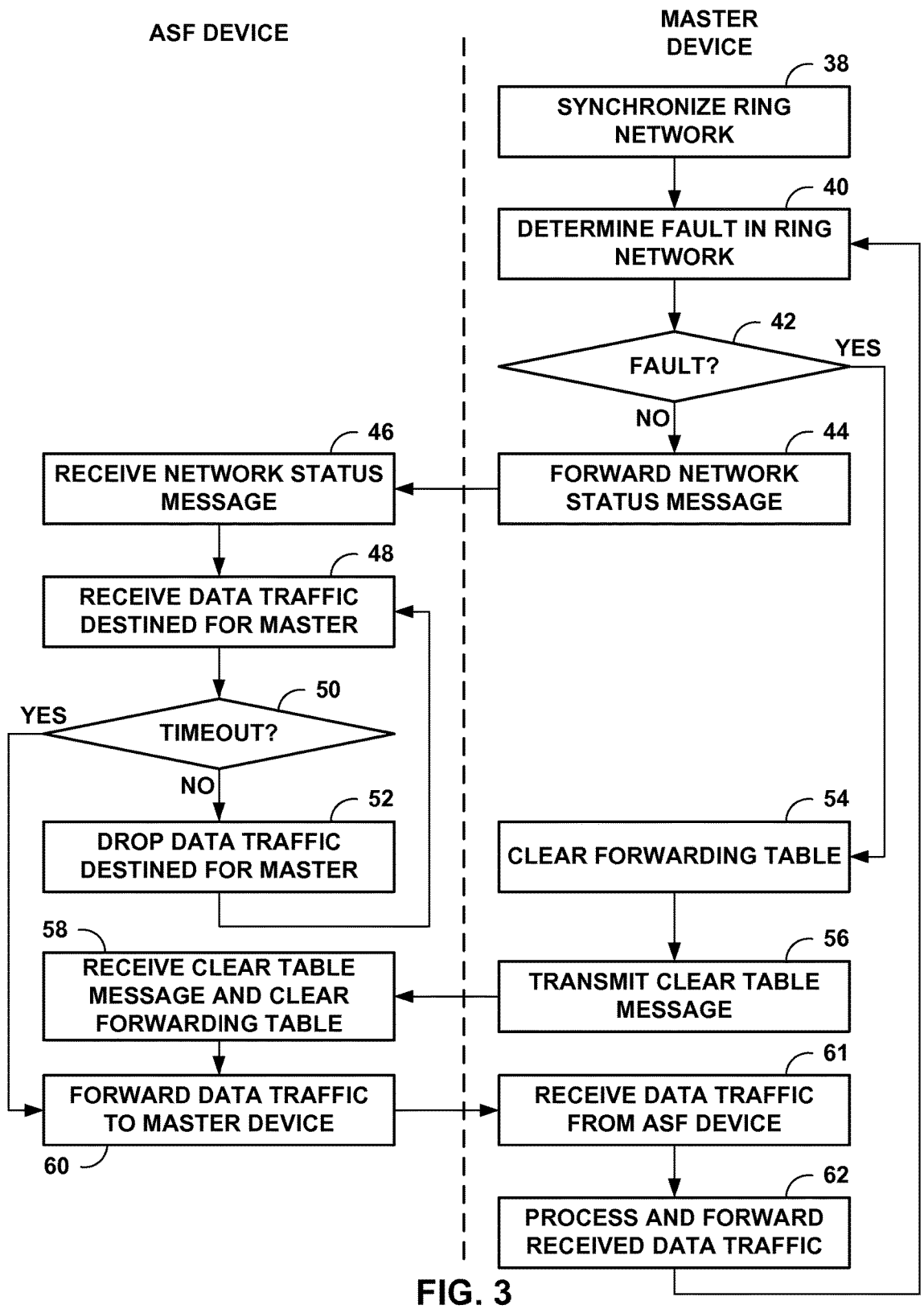
FIG. 3 is a flow chart illustrating an example operation of a master network device and an ASF network device in performing the efficient network management techniques described in this disclosure.

FIG. 3 is a flow chart illustrating an example operation of a master network device and an ASF network device in performing the efficient network management techniques described in this disclosure. Although described below with respect to master network device 12A and ASF network device 12N of FIG. 2, the techniques may apply to any network devices that reside within and manage a network, such as ring network 10.

Initially, a user, such as an administrator may designate or configure network device 12A and network device 12N as respective master and ASF network devices, as described above. During this configuration process, the administrator may also designate or configure primary and secondary ports 34A, 34B for one or more of network devices 12. The administrator may then reset, activate, or otherwise enable network devices 12 to begin receiving packets or data traffic from customer networks 16 and forwarding this data traffic to other network devices 12 to enable the exchange of data traffic between customer networks 16.

Once enabled, master network device 12A may synchronize ring network 10, as described above (38). That is, forwarding module 22A of master network device 12A may forward a synch message 36A via primary port 34A such that synch message 36A traverses ring network 10 and is received by secondary port 34B of master network device 12A. Every network device 12 therefore receives synch message 36A and determines their appropriate role in ring network 10 and the appropriate use of links 14.

Once synchronized, network device 12 may begin originating and delivering data traffic or, in other words, exchanging data traffic between customer networks 16 via ring network 10. Simultaneous to this exchange, master network device 12A may additionally monitor ring network 10 to determine whether one of links 14 has faulted or otherwise malfunctioned such that this link 14 stops relaying traffic (40). More specifically, forwarding module 22A may transmit a continuity check message 36C via primary port 34A, reset continuity timer 26, and wait to receive continuity check message 36C via secondary port 34B.

If forwarding module 22A receives continuity check message 36C via secondary port 34B, forwarding module 22A determines that all of links 14 are operational, or in other words, that none of links 14 have faulted ("NO" 42). If none of links 14 have faulted, forwarding module 22A transmits a network status message 36B to ASF network device 12N in the manner described above (44).

ASF network device 12N receives network status message 36B and may also receive data traffic destined for master network device 12A via link 14M (46, 48). As described above, ASF network device 12N selectively forwards the received data traffic based on status timer 30. That is, ASF network device 12N may, upon receiving network status message 36B, reset status timer 30. If status timer 30, "timeouts" or otherwise expires prior to receiving a subsequent network status message 36B from master network device 12A ("NO" 50), ASF network device 12N selectively forwards the received data traffic by dropping the data traffic destined for master network device 12A (52). ASF network device 12N may continuously drop the received data traffic destined for master network device 12A until status timer 30 times out or otherwise expires (48-52).

Master network device 12A may continuously forward network status message 36B, until a fault is detected ("YES" 42). Master network device 12A may determine the fault in one of the two ways listed above, as well as, any other way a network device may be able to determine a fault in a link of a network. That is, forwarding module 22A may, in accordance with the first way, not receive via secondary port 34B a continuity check message 36C prior to the expiration of continuity timer 26. In the second way, forwarding module 22A may receive a link-down message 36D from one of network devices 12. Regardless of how the fault is determined, forwarding module 22A of master network device 12A clears forwarding table 24A in response to determining that one of links 14 has faulted (54). In some instances, forwarding module 22A may also transmit a link-down message 36D to ASF network device 12N to alert ASF network device 12N of the fault.

After clearing forwarding table 24A, forwarding module 22A issues a clear table message 36E that causes each of network devices 12 to clear respective forwarding tables 24 (56). For example, ASF network device 12N or better stated forwarding module 22N, upon receiving clear table message 36E, clears forwarding table 24N (58). Because master network device 12A, in response to detecting the fault, stops transmitting network status message 36B, status timer 30 of ASF network device 12N may also timeout or otherwise expire, such that either before or after clearing forwarding table 24N, forwarding module 22N begins selectively forwarding the data traffic by forwarding the data traffic destined for master network device 12A to master network device 12A via link 14N (60).

Master network device 12A or, more particularly, forwarding module 22A of master network device 12A receives the data traffic from ASF network device 12N, processes the data traffic and forwards the received data traffic (61, 62). During processing of the data traffic, master network device 12A may update forwarding table 24A such that it learns or otherwise stores reachable addresses, next hops, or other pertinent routing or forwarding information to forwarding table 24A, as described above. Each of network devices 12 may also performing this learning and/or storing operation to, in effect, route traffic around the one of links 14 that faulted.

Master network device 12A may continue to monitor ring network 10 to determine whether the faulted one of links 14 has been repaired or, in some instances, whether an additional fault has occurred, and perform the above described operations depending on the outcome of the monitoring (40-62). That is, should the fault be repaired, master network device 12A may not detect a fault, and begin to continuously transmit network status messages 36B, whereupon ASF network device 12N may, in response to receiving network status message 36B, begin selectively forwarding the data traffic by dropping the data traffic (42-52). Although not shown in FIG. 3, master network device 12A may clear forwarding table 24A and issue another clear table message 36E such that network devices 12 once again clear respective forwarding tables 24 to relearn the topology of network 10.

If the fault persists, ASF network device 12A may continue to timeout, and forward data traffic to master network device 12A (50, 60). Master network device 12A therefore may continue to receive, process, and forward the data traffic (56, 60, 62). Although shown as continually clearing forwarding table 24A and issuing or transmitting a clear table message 36E, master network device 12A may only perform these operations upon initially detecting the fault. Thus, as shown in FIG. 2, master network device 12A may include a fault flag 27 that indicates whether a fault has previously occurred. Master network device 12A may set fault flag 27 (e.g., to "true") upon detecting a fault, and check fault flag 27 prior to clearing forwarding table 24A and transmitting clear table message 36E. This fault flag 27 may comprise a register, variable, or any other data structure that can be employed to store a state so as to prevent repeated clearing of forwarding tables 24A.

Figure 4:
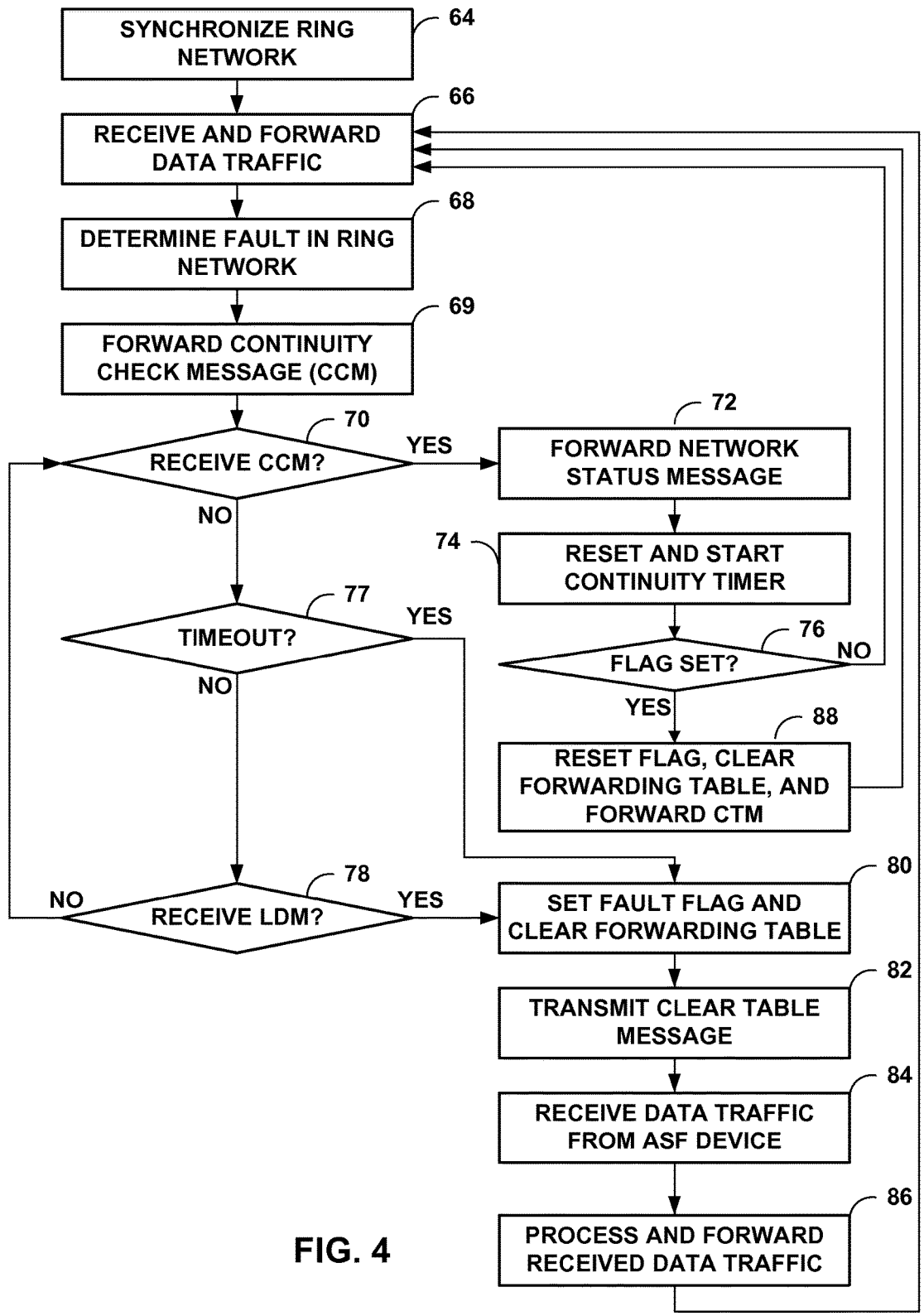
FIG. 4 is a flowchart illustrating example operation of a master network device in performing the efficient network management techniques described in this disclosure.

FIG. 4 is a flowchart illustrating example operation of a master network device, such as master network device 12A of FIG. 2, in performing the efficient network management techniques described in this disclosure. Initially, master network device 12A synchronizes a network, such as ring network 10 of FIG. 1, as described above (64). Once synchronized, forwarding module 22A of master network device 12A may receive and forward data traffic in accordance with forwarding table 24A (66).

While receiving and forwarding data traffic, forwarding module 22A may further monitor ring network 10 to determine whether one of links 14 has faulted or otherwise malfunctioned (68). As described above, forwarding module 22A may determine a fault in one of two ways.

In the first way, forwarding module 22A may reset and start continuity timer 26 and forward a continuity check message 36C via primary port 34A around ring network 10 (69). Forwarding module 22A then waits to receive continuity check message 36C via secondary port 34B (70). Upon receiving continuity check message 36C, forwarding module 22A forwards network status message 36B to an ASF network device, such as ASF network device 12N, and resets and starts continuity timer 26 (72, 74). Forwarding module 22A may also check error flag 27 to determine whether a fault had previously been detected (76). In this instance, as no previous fault was detected, error flag 27 is not set and forwarding module 22A continues to receive and forward data traffic (66) while simultaneously monitoring ring network 10 by forwarding continuity check message 36C (68, 69).

If however forwarding module 22A does not receive continuity check message 36C, forwarding module 22A may determine whether continuity timer 26 has expired or otherwise timed out (77). If continuity timer 26 has not expired or timed out, forwarding module 22A determines whether it has received a link-down message 34D ("LDM" in FIG. 4) (78). That is, in accordance with the second above described way, forwarding module 22A may also determine whether one of links 14 has faulted upon receiving a link down message 34D. If continuity timer 26 has not expired and forwarding module 22A has not received link down message 36D (77, 78), forwarding module 22A continues to wait for continuity check message 36C (70).

However, if continuity timer 26 has expired or forwarding module 22A receives a link down message 36D, forwarding module 22A determines that a fault occurred in one of links 14. Based on this determination, forwarding module 22A sets fault flag 27, clears forwarding table 24A and transmits a clear table message 36E, as described above (80, 82). Forwarding module 22A, although not explicitly shown in FIG. 4, stops transmitting network status message 36B, which causes ASF network device 12N to, at some point, begin forwarding data traffic to master network device 12A in accordance with the efficient management techniques as described in this disclosure.

Forwarding module 22A receives, processes and forwards this data traffic from ASF network device 12N also as described above (84, 86). Forwarding module 22A processes the data traffic in a manner that enables forwarding module 22A to relearn destinations and repopulate forwarding table 24A, thereby enabling forwarding module 22A to account for the changes to the topology of ring network 10, e.g., the forwarding of data traffic by ASF network device 12N and the faulted one of links 14. Forwarding module 22A may continue to receive and forward data traffic and monitor ring network 10 to determine when the fault has been resolved by forwarding continuity check message 36C at regular intervals (66-69).

Upon resolving the fault, forwarding module 22A may receive continuity check message 36C and proceed to once again forward network status message 36B and reset and start continuity timer 26 (72, 74). However, as fault flag 27 has now been set, forwarding module 22A determines fault flag 27 has been previously set, thereby indicating that a fault previously existed but has since been resolved (76). In response to this determination, forwarding module 22A resets error flag 27, clears forwarding table 24A, and issues or forwards clear table message ("CTM" in FIG. 4) 36E (88). By clearing forwarding table 24A and forwarding clear table message 36E, master network device 12A causes each of network devices 12 to relearn the topology of ring network 10, thereby accounting for any changes, such as the resolution of the detected fault and that ASF network device 12N may being dropping data traffic destined for master network device 12A.

Figure 5:
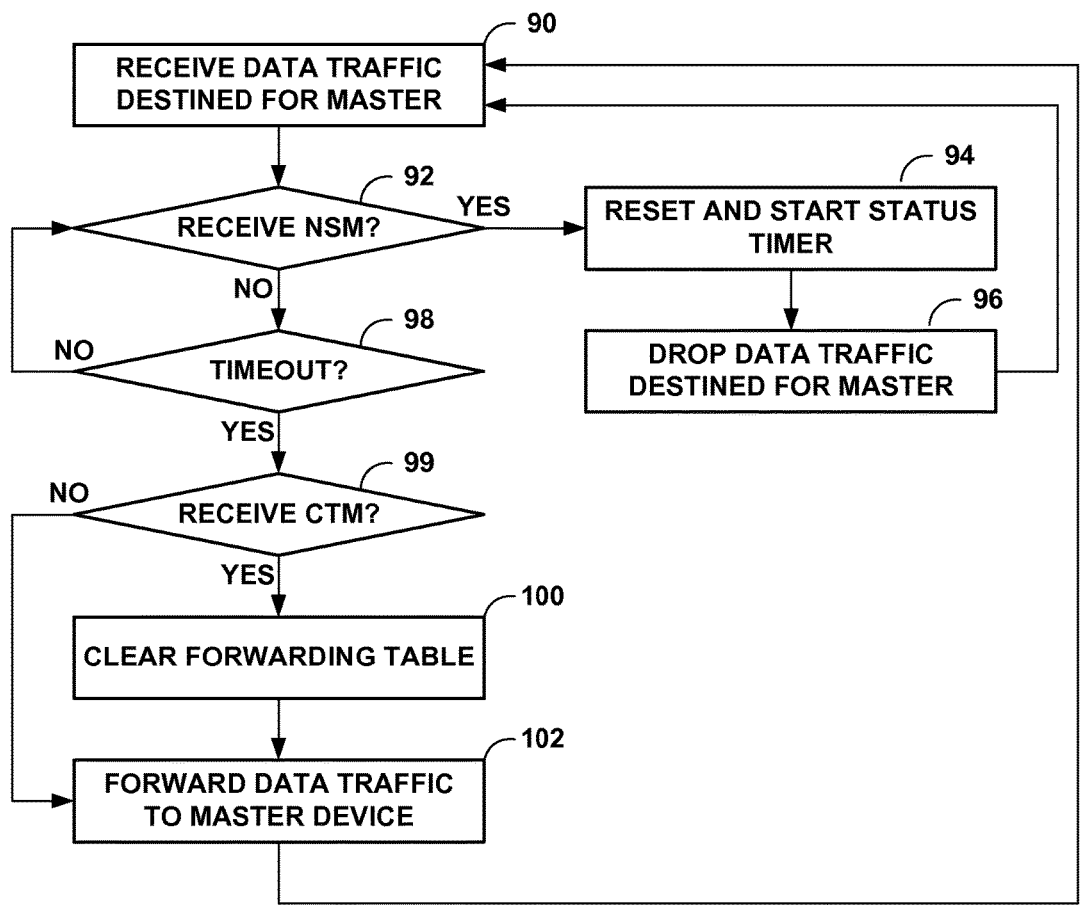
FIG. 5 is a flow chart illustrating example of an ASF network device in performing the efficient management techniques described in this disclosure.

FIG. 5 is a flow chart illustrating example of an ASF network device, such as ASF network device 12N of FIG. 2, in performing the efficient management techniques described in this disclosure. Although not shown in FIG. 5 for ease of illustration purposes, ASF network device 12N may be designated as the ASF network device in accordance with the above described synchronization phase.

ASF network device 12N may receive data traffic destined for master network device 12A, such as broadcast, multicast, or any other types of data traffic that do not include a specific destination (90). Upon receiving this data traffic, ASF network device 12N may selectively forward the data traffic depending on the state of the network as determined by reception of a network status message ("NSM" in FIG. 5) 36B (92). If ASF network device 12N or, more particularly, forwarding module 22N receives network status message 36B from master network device 12A, forwarding module 22N resets and starts status timer 30 and selectively forwards the data traffic by dropping the data traffic destined for master network device 12A, as described above (94, 96). Forwarding module 22N continues to selectively forward the data traffic in this manner until status timer 30 expires or otherwise times out (90-96).

If forwarding module 22N does not, as described above, receive network status message 36B prior to expiration of status timer 30 (98), forwarding module 22N may, at some point, receive clear table message ("CTM" in FIG. 5) 36E ("YES" 99) and clear forwarding table 24N in response to that message 36E, thereby relearning the topology of ring network 10 in the manner described above (100). If not yet received ("NO" 99), forwarding module 22N selectively forwards the data traffic by actively forwarding the data traffic destined for master network device 12A (100).

Regardless of when clear table message 36E is received, forwarding module 22N, in response to the timeout or expiration of status timer 30, begins selectively forwarding the above described data traffic to master network device 12A via link 14N (102). Forwarding module 22A continues to selectively forward the data traffic in this manner (102, 90, 92, 98, 100) until such time as it receives a networks status message 36B, whereupon forwarding module 22A may revert or switch back to selectively forwarding the data traffic by dropping the data traffic (90-96).

The techniques described in this disclosure may be implemented in hardware, software, firmware, or any combination thereof. Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a computer-readable storage medium comprising instructions that, when executed in a processor, cause the processor to perform one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of the invention have been described. These and other embodiments are within the scope of the following claims.

The invention claimed is:

1. A method comprising:
   determining, with a first device of a ring network that is adjacent to a second device in the ring network designated as a master device that manages operation of the ring network, whether a fault has occurred in the ring network, wherein the first device includes a primary port and a secondary port, and wherein the primary port of the first device couples to a network link of the ring network that connects the first device directly to the master device;
   receiving data traffic with the secondary port of the first device; and
   dropping the received data traffic until determining that the fault has occurred in the ring network.

2. The method of claim 1, wherein dropping the received data traffic comprises selectively forwarding traffic to the master device via the primary port in a manner that avoids traffic loops by dropping the received data traffic until determining that the fault has occurred in the ring network.

3. The method of claim 1, further comprising forwarding control traffic via the network link to the master device regardless of the determination of whether the fault has occurred in the ring network.

4. The method of claim 1, wherein determining whether a fault has occurred in the ring network comprises:
   receiving a message indicating whether a fault has occurred in the ring network; and
   determining whether the fault has occurred in the ring network in response to receiving the message.

5. The method of claim 1, wherein determining whether a fault has occurred in the ring network comprises:
   receiving with the first device a network status message that indicates whether the fault has occurred in the ring network; and
   determining with the first device whether the fault has occurred based on whether receipt of the network status message occurred prior to expiration of a status timer of the first device.

6. The method of claim 5, wherein determining whether a fault has occurred in the ring network further comprises:
   determining that no fault has occurred upon receiving the network status message prior to expiration of the status timer; and
   resetting with the first device the status timer based on the determination that no fault has occurred.

7. The method of claim 1, further comprising receiving with the first device a synchronization message and a network status message prior to selectively forwarding data traffic in order to designate the first device as an adjacent selective forwarding (ASF) device.

8. The method of claim 1, further comprising:
   receiving a clear tables message with the first device; and
   clearing a forwarding table of the first device such that the first device relearns a topology of the ring network.

9. The method of claim 1, further comprising forwarding the data traffic to the master device based on the determination that no fault has occurred in the ring network.

10. The method of claim 1,
    wherein the master device includes a primary port and a secondary port,
    wherein the secondary port of the master port couples to the network link of the ring network that connects the first device directly to the master device, and
    wherein the method further comprises:
    monitoring, with the master device, the ring network to determine whether a fault has occurred in the ring network; and
    blocking the secondary port of the master device until the master device determines that the fault has occurred in the ring network.

11. The method of claim 10, wherein monitoring the ring network comprises:
    starting a continuity timer of the master device;
    transmitting via the primary port of the master device a continuity check message; and
    determining whether the fault has occurred based on whether the master device receives the continuity check message via the secondary port before the continuity timer expires.

12. The method of claim 10, wherein monitoring the ring network comprises:
    receiving a link-down message with the master device; and
    determining from the link-down message that the fault has occurred in the ring network.

13. A network device adjacent in a ring network to another network device designated as a master device that manages operation of the ring network, the network device comprising:
   an interface module that includes a primary port and a secondary port, wherein the primary port couples to a network link of the ring network that connects the network device directly to the master device; and
   a control unit that determines whether a fault has occurred in the ring network,
   wherein the secondary port receives data traffic, and
   wherein the interface module drops the received data traffic until the control unit determines that the fault has occurred in the ring network.

14. The network device of claim 13, wherein the interface module forwards the received data traffic to the master device via the primary port in a manner that avoids traffic loops by dropping the received data traffic until determining that the fault has occurred in the ring network.

15. The network device of claim 13, wherein the interface module forwards control traffic via the network link to the master device regardless of the determination of whether the fault has occurred in the ring network.

16. The network device of claim 13, wherein the control unit further receives a message indicating whether a fault has occurred in the ring network and determines whether the fault has occurred in the ring network in response to receiving the message.

17. The network device of claim 13, wherein the control unit further receives a network status message that indicates whether the fault has occurred in the ring network and determines whether the fault has occurred based on whether receipt of the network status message occurred prior to expiration of a status timer of the network device.

18. The network device of claim 17, wherein the control unit further determines that no fault has occurred upon receiving the network status message prior to expiration of the status timer and resets the status timer based on the determination that no fault has occurred.

19. The network device of claim 13, wherein the interface module receives a synchronization message and a network status message prior to dropping the data traffic in order to designate the network device as an adjacent selective forwarding (ASF) device.

20. The network device of claim 13, wherein the interface module further receives a clear tables message with the network device and clears a forwarding table such that the interface module relearns a topology of the ring network.

21. The network device of claim 13, wherein the interface module forwards the data traffic to the master device based on the determination that no fault has occurred in the ring network.

22. A network device adjacent in a ring network to another network device designated as a master device that manages operation of the ring network, the network device comprising: means for determining whether a fault has occurred in the ring network, wherein the first device includes a primary port and a secondary port, wherein the primary port of the first device couples to a network link of the ring network that connects the first device directly to the master device;
   means for receiving data traffic with the secondary port of the first device; and
   means for dropping the received data traffic until determining that the fault has occurred in the ring network.

23. The network device of claim 22, further comprising: means for receiving a message indicating whether a fault has occurred in the ring network, and
   wherein the means for determining comprises means for determining whether the fault has occurred in the ring network in response to receiving the message.

24. The network device of claim 22, further comprising:
   means for receiving a network status message that indicates whether the fault has occurred in the ring network; and
   means for determining whether the fault has occurred based on whether receipt of the network status message occurred prior to expiration of a status timer of the first device.

25. The network device of claim 24, further comprising:
   means for determining that no fault has occurred upon receiving the network status message prior to expiration of the status timer; and
   means for resetting with the first device the status timer based on the determination that no fault has occurred.

26. The network device of claim 22, further comprising:
   means for receiving a clear tables message with the first device; and
   means for clearing a forwarding table of the first device such that the first device relearns a topology of the ring network.

27. A non-transitory computer-readable medium comprising instructions that, when executed, cause one or more processors to:
   determine, with a first device of a ring network that is adjacent to a second device in the ring network designated as a master device that manages operation of the ring network, whether a fault has occurred in the ring network, wherein the first device includes a primary port and a secondary port, wherein the primary port of the first device couples to a network link of the ring network that connects the first device directly to the master device;
   receive data traffic with the secondary port of the first device; and
   drop the received data traffic until determining that the fault has occurred in the ring network.

28. The non-transitory computer-readable medium of claim 27, further comprising instructions that, when executed, cause the one or more processors to selectively forward traffic to the master device via the primary port in a manner that avoids traffic loops by dropping the received data traffic until determining that the fault has occurred in the ring network.

29. The non-transitory computer-readable medium of claim 27, further comprising instructions that, when executed, cause the one or more processors to forward control traffic via the network link to the master device regardless of the determination of whether the fault has occurred in the ring network.

30. The non-transitory computer-readable medium of claim 27, further comprising instructions that, when executed, cause the one or more processors to:
   receive a message indicating whether a fault has occurred in the ring network; and
   determine whether the fault has occurred in the ring network in response to receiving the message.

31. The non-transitory computer-readable medium of claim 30, further comprising instructions that, when executed, cause the one or more processors to:
   receive with the first device a network status message that indicates whether the fault has occurred in the ring network; and determine with the first device whether the fault has occurred based on whether receipt of the network status message occurred prior to expiration of a status timer of the first device.

32. The non-transitory computer-readable medium of claim 31, further comprising instructions that, when executed, cause the one or more processors to:
determine that no fault has occurred upon receiving the network status message prior to expiration of the status timer; and
reset with the first device the status timer based on the determination that no fault has occurred.

33. A network system comprising:
a ring network that includes a first network device and a second network device,
wherein the first network device is adjacent to the second network device in the ring network,
wherein the second network device is designated as a master device that manages operation of the ring network, and
wherein the first network device comprises:
an interface module that includes a primary port and a secondary port, wherein the primary port couples to a network link of the ring network that connects the network device directly to the master device; and
a control unit that determines whether a fault has occurred in the ring network,
wherein the secondary port receives data traffic, and
wherein the interface module drops the received data traffic until the control unit determines that the fault has occurred in the ring network.

* * * * *